United States Patent
Chen et al.

(10) Patent No.: US 9,374,181 B2
(45) Date of Patent: Jun. 21, 2016

(54) MOBILE TERMINAL AND METHOD FOR RECEIVING AND TRANSMITTING RADIO FREQUENCY SIGNAL

(71) Applicant: ZTE CORPORATION, Shenzhen, Guangdong Province (CN)

(72) Inventors: Jianqiang Chen, Shenzhen (CN); Xiangjie Tong, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 14/416,731

(22) PCT Filed: Jul. 23, 2013

(86) PCT No.: PCT/CN2013/079865
§ 371 (c)(1),
(2) Date: Jan. 23, 2015

(87) PCT Pub. No.: WO2013/178159
PCT Pub. Date: Dec. 5, 2013

(65) Prior Publication Data
US 2015/0200736 A1 Jul. 16, 2015

(30) Foreign Application Priority Data
Aug. 21, 2012 (CN) .......................... 2012 1 0298725

(51) Int. Cl.
*H04H 20/72* (2008.01)
*H04W 88/06* (2009.01)
(Continued)

(52) U.S. Cl.
CPC ............... *H04H 20/72* (2013.01); *H04H 40/18* (2013.01); *H04W 88/06* (2013.01); *H04W 4/06* (2013.01)

(58) Field of Classification Search
CPC ...... H04H 20/72; H04H 40/18; H04W 88/06; H04W 4/06
See application file for complete search history.

(56) References Cited

U.S. PATENT DOCUMENTS 8,369,250 B1 * 2/2013 Khlat ............................ 370/280
2004/0066337 A1 * 4/2004 Fukuda et al. ......... 343/700 MS
(Continued)

FOREIGN PATENT DOCUMENTS

CN 101369819 A 2/2009
CN 202352836 U 7/2012
(Continued)

OTHER PUBLICATIONS

European Search Report dated Jun. 15, 2015 of European patent Application No. 13797593.4.
(Continued)

*Primary Examiner* — Brandon Miller
(74) *Attorney, Agent, or Firm* — Plumsea Law Group, LLC

(57) ABSTRACT

A mobile terminal and a method for transmitting and receiving radio frequency signals, including: an antenna, a wireless communication transmitting module and a mobile multimedia broadcast receiving module which are connected to the antenna, a first filter which is connected between the wireless communication transmitting module and the antenna, and a second filter which is connected between the mobile multimedia broadcast receiving module and the antenna, wherein the first filter and the second filter are configured to suppress sideband noise generated on the mobile multimedia broadcast receiving module when the wireless communication transmitting module transmits signals.

11 Claims, 5 Drawing Sheets

(51) Int. Cl.
*H04H 40/18* (2008.01)
*H04W 4/06* (2009.01)

(56) References Cited

U.S. PATENT DOCUMENTS

| | | | |
|---|---|---|---|
| 2008/0238789 A1* | 10/2008 | Wilcox | 343/750 |
| 2009/0285135 A1 | 11/2009 | Rousu et al. | |
| 2010/0127795 A1* | 5/2010 | Bauer et al. | 333/134 |
| 2011/0090026 A1* | 4/2011 | Nakahashi et al. | 333/195 |
| 2012/0122522 A1* | 5/2012 | Jang et al. | 455/557 |
| 2012/0243449 A1* | 9/2012 | He | 370/281 |

FOREIGN PATENT DOCUMENTS

| | | |
|---|---|---|
| CN | 102833689 A | 12/2012 |
| EP | 1883164 A1 | 1/2008 |
| KR | 1020070040944 A | 4/2007 |
| KR | 100783112 B1 | 12/2007 |

OTHER PUBLICATIONS

Office Action dated Nov. 17, 2015 issued in counterpart Korean Patent Application No. 10-2015-7003737 (4pp).

\* cited by examiner

MOBILE TERMINAL AND METHOD FOR RECEIVING AND TRANSMITTING RADIO FREQUENCY SIGNAL

CROSS-REFERENCE TO RELATED APPLICATION(S)

This application is the U.S. National Phase application of PCT application number PCT/CN2013/079865 having a PCT filing date of Jul. 23, 2013, which claims priority of Chinese patent application 201210298725.4 filed on Aug. 21, 2012, the disclosures of which are hereby incorporated by reference.

TECHNICAL FIELD

The present document relates to the field of mobile communication and mobile multimedia broadcasting technologies, and more particularly, to a mobile terminal and a method for transmitting and receiving radio frequency signals.

BACKGROUND

China Mobile Multimedia Broadcasting (CMMB) uses the mobile TV receiving standard STiMi, which is applicable to broadcast service frequencies in the frequency range of 30 MHz to 3000 MHz, the CMMB is a broadcasting system which transmits multimedia signals such as television, broadcast and data information via satellite and terrestrial radios and can achieve nationwide roaming. The CMMB uses two sets of receiving systems to support the U-band (470 MHz~798 MHz) and S-band (2635~2660 MHz) simultaneously, the U-band receives signals from the terrestrial forwarding networks, and the S-band receives TV broadcast signals from the satellites.

Currently, all the CMMB terminal schemes use separate antennas to achieve the CMMB reception, this is because the communication frequency band of the mobile terminals is very close to the frequency band of the CMMB, the sideband noise of the mobile communication module will fall in the CMMB receiving frequency band, and generate interference with the CMMB reception, thereby affecting the reception sensitivity, and leading to bit errors in the received programs, especially it has a greater impact on the CMMB reception because the transmitting frequency band (880 MHz~915 MHz) of the global system for mobile (GSM) 900 is very close to the U receiving frequency band (470 MHz~798 MHz) of the CMMB, and according to the stray testing standard in the 3GPP protocol, the minimum stray requirements of the GSM900 in the U-band is −36 dBm@3 MHz, the U-band receiving sensitivity of the CMMB is required to be higher than −95 dBm@8 MHz, the co-channel interference is required to be less than 9.2 dB, then it can be derived that the co-channel interference should not be greater than −85.8 dBm@8 MHz; considering that the sideband noise generated by the GSM900 transmission in the U-band is −36 dBm@3 MHz in the worst case, it is far beyond the co-channel interference acceptable by the CMMB.

In addition, the personal communications services (PCS) 1900 transmitting frequency band (1850 MHz~1910 MHz) is also very close to the S receiving frequency band of the CMMB and has an impact on the S-band reception of the CMMB, but the impact is slightly smaller compared to the GSM900; in order to lower the interferences in these frequency bands, currently the common practice is to use separate antennas in the CMMB and the communication module to implement spatial isolation, so as to prevent the CMMB from the co-channel interference by improving the spatial isolation. However, this mode increases the difficulty of structural design, and its hardware cost is relatively high.

SUMMARY

To solve the technical problem, the embodiment present document provides a mobile terminal and a method for transmitting and receiving radio frequency signals, to use the same antenna to achieve wireless communication and mobile multimedia broadcast.

To solve the abovementioned technical problem, a mobile terminal in accordance with an embodiment of the present document comprises: an antenna, a wireless communication transmitting module and a mobile multimedia broadcast receiving module which are connected with the antenna, a first filter which is connected between the wireless communication transmitting module and the antenna, and a second filter which is connected between the mobile multimedia broadcast receiving module and the antenna, wherein:

the first filter and the second filter are configured to suppress sideband noise generated on the mobile multimedia broadcast receiving module when the wireless communication transmitting module transmits signals.

Alternatively, the mobile terminal further comprises: a switch; wherein the wireless communication transmitting module comprises a first wireless communication transmitting module and a second wireless communication transmitting module, the first wireless communication transmitting module and the second wireless communication transmitting module are connected with the antenna via the switch, wherein:

the switch is configured to control to transmit signals of the first wireless communication transmitting module or the second wireless communication transmitting module to the antenna.

Alternatively, the first filter is a band-pass filter, and the switch is connected with the antenna via the band-pass filter.

Alternatively, the first filter comprises a first high-pass filter and a first low-pass filter, the first wireless communication transmitting module is connected with the switch through the first high-pass filter, and the second wireless communication transmitting module is connected with the switch through the first low-pass filter.

Alternatively, the mobile multimedia broadcast receiving module comprises a first mobile multimedia broadcast receiving module and a second mobile multimedia broadcast receiving module, the second filter is a band-stop filter, and the first mobile multimedia broadcast receiving module and the second mobile multimedia broadcast receiving module are respectively connected with the antenna through the band-stop filter.

Alternatively, the mobile multimedia broadcast receiving module comprises a first mobile multimedia broadcast receiving module and a second mobile multimedia broadcast receiving module, the second filter comprises a second low-pass filter and a second high-pass filter, the first mobile multimedia broadcast receiving module is connected with the antenna through the second low-pass filter, the second mobile multimedia broadcast receiving module is connected with the antenna through the second high-pass filter.

Alternatively, the first wireless communication transmitting module is a Global System for Mobile (GSM) 900 wireless communication transmitting module, the second wireless communication transmitting module is a Personal Communications Services (PCS) 1900 wireless communication transmitting module, the first mobile multimedia broadcast receiving module is a China mobile Multimedia Broadcasting (CMMB) U-band receiving module, the second mobile multimedia broadcast receiving module is a CMMB S-band receiving module.

A method for transmitting and receiving radio frequency signals in accordance with an embodiment of the present document comprises:

when a wireless communications service and a mobile multimedia broadcast service co-occur, the mobile terminal filtering signals of the to-be-transmitted wireless communications service to suppress sideband noise generated on signals of the mobile multimedia broadcast service when transmitting the signals of the wireless communication service, and transmitting signals of the wireless communication service via the antenna;

meanwhile the mobile terminal receiving signals of the mobile multimedia broadcast service via the antenna, and filtering the signals of the mobile multimedia broadcast service to suppress the sideband noise generated on the signals of the mobile multimedia broadcast service when transmitting the signals of the wireless communication service.

Alternatively, the mobile terminal comprises a first wireless communication transmitting module and a second wireless communication transmitting module, wherein band-pass filters are used for filtering signals of the wireless communication services transmitted by the first wireless communication transmitting module and the second wireless communication transmitting module, or, a first high-pass filter is used for filtering the signals of the wireless communication service transmitted by the first wireless communication transmitting module, and a first low-pass filter is used for filtering the signals of the wireless communication service transmitted by the second wireless communication transmitting module.

Alternatively, the mobile terminal comprises a first mobile multimedia broadcast receiving module and a second mobile multimedia broadcast receiving module, wherein band-stop filters are used to filter signals of mobile multimedia broadcast services received by the first mobile multimedia broadcast receiving module and the second mobile multimedia broadcast receiving module, or, a second low-pass filter is used to filter the signals of the mobile multimedia broadcast service received by the first mobile multimedia broadcast receiving module, and a second high-pass filter is used to filter the signals of the mobile multimedia broadcast service received by the second mobile multimedia broadcast receiving module.

In summary, by adding filters into the wireless communication link and the CMMB receiving path, the embodiment of the present document suppresses the sideband noise in the transmitting frequency band of the wireless communication transmitting module to achieve the common antenna scheme of the wireless communication transmitting module and the CMMB, thus prevent the radio frequency signals of the wireless communication transmitting module in the terminal from interfering with the CMMB, the GSM900/PCS1900 frequency band of the wireless communication transmitting module and the U/S-band of the CMMB in accordance with the embodiment of the present document can share one antenna, thereby reducing the difficulty of structural design and the hardware cost, meanwhile both radio frequency systems can work simultaneously, while the wireless communication transmitting module does not interfere with reception performance of the CMMB.

PREFERRED EMBODIMENTS OF THE INVENTION

Hereinafter in conjunction with the accompanying drawings, the embodiments of the present document will be described in detail. It should be noted that, in the case of no conflict, the embodiments and features in the embodiments of the present application may be arbitrarily combined with each other.

By adding filters respectively into the branch of the wireless communication transmitting module and the CMMB receiving branch, the embodiment of the present document solves the technical problem of co-channel interference in receptions in the U-band and the S-band of the CMMB with the common antenna.

The mobile terminal in accordance with the present embodiment comprises: an antenna, a wireless communication transmitting module, and a mobile multimedia broadcast receiving module, a first filter and a second filter, wherein the antenna is respectively connected with the wireless communication transmitting module and the mobile multimedia broadcast receiving module, the first filter is connected between the wireless communication transmitting module and the antenna, the second filter is connected between the mobile multimedia broadcast receiving module and the antenna, the first filter and the second filter are configured to suppress the sideband noise generated on the mobile multimedia broadcast receiving module when the wireless communication transmitting module transmits signals.

In the following, in conjunction with the accompanying drawings, the mobile terminal in accordance with the present embodiment will be described.

Figure 1:
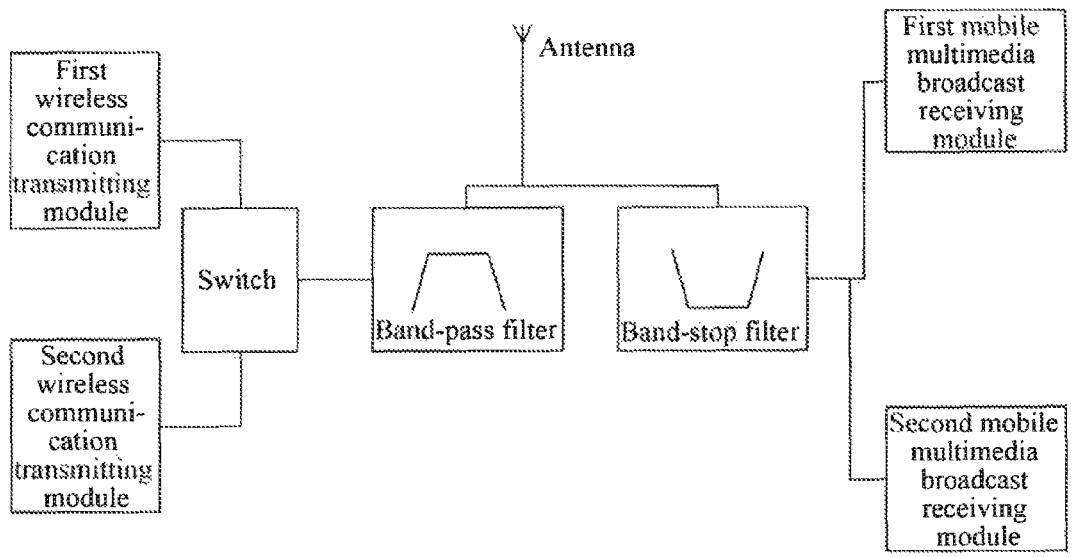
FIG. 1 to FIG. 4 are system block diagrams of a mobile terminal in accordance with an embodiment of the present document.

As shown in FIG. 1, the wireless communication transmitting module comprises a first wireless communication transmitting module and a second wireless communication transmitting module, the mobile multimedia broadcast receiving module comprises a first mobile multimedia broadcast receiving module and a second mobile multimedia broadcast receiving module, the first wireless communication transmitting module and the second wireless communication transmitting module are connected with the antenna through the switch, the switch controls whether to send the signals of the first wireless communication transmitting module or the signals of the second wireless communication transmitting module to the antenna.

In FIG. 1, the first filter is a band-pass filter, the first wireless communication transmitting module and the second wireless communication transmitting module are respectively connected with the switch, the switch is also connected with the band-pass filter, and the band-pass filter is connected with the antenna. The second filter is a band-stop filter, the first mobile multimedia broadcast receiving module and the second mobile multimedia broadcast receiving module are respectively connected with the band-stop filter, and the band-stop filter is also connected with the antenna.

The first wireless communication transmitting module is a GSM900 wireless communication transmitting module, the second wireless communication transmitting module is a PCS1900 wireless communication transmitting module, the first mobile multimedia broadcast receiving module is a CMMB U-band receiving module, and the second mobile multimedia broadcast receiving module is a CMMB S-band receiving module.

A band-pass filter is added between the antenna and the wireless communication transmitting module, and this filter allows the signals in the GSM900 and PCS1900 transmitting frequency bands pass through successfully, but greatly attenuates the sideband noise in the U-band and S-band of the CMMB, so as to effectively suppress the sideband interference generated by the GSM900 transmission in the U-band and the sideband interference generated by the PCS1900 transmission in the S-band, and to reduce the co-channel interference of the CMMB reception.

Band-stop filters are added between the antenna and the U-band and S-band receiving paths of the CMMB to effectively suppress the sideband signals in the GSM900 and PCS1900 transmitting frequency bands again, but do not attenuate the CMMB signals at all.

Figure 2:
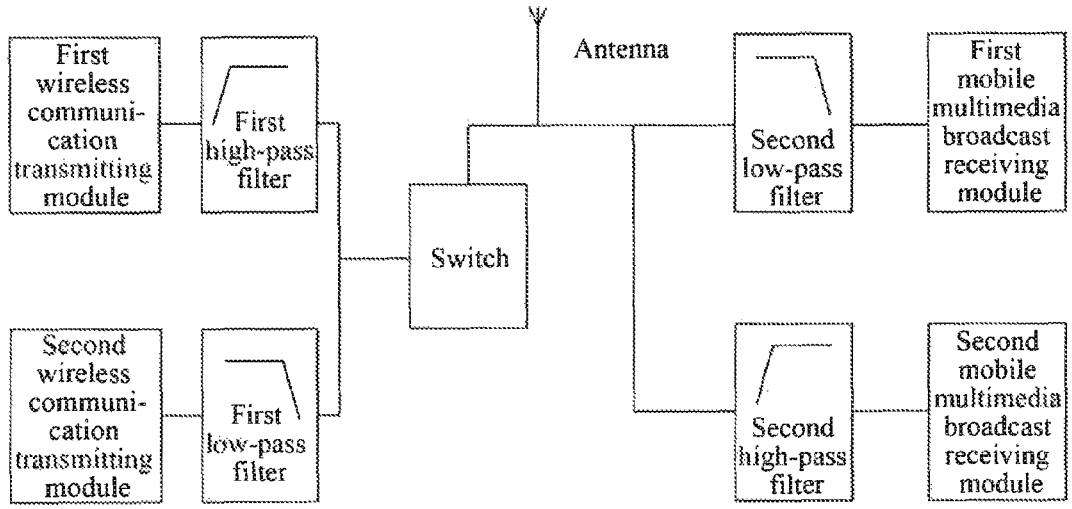

As shown in FIG. 2, the first filter in the present embodiment comprises a first high-pass filter and a first low-pass filter, the first high-pass filter is connected with the first wireless communication transmitting module and the switch, the first low-pass filter is connected with the second wireless communication transmitting module and the switch, the switch is also connected with the antenna. The second filter comprises a second low-pass filter and a second high-pass filter, the second low-pass filter is connected with the first mobile multimedia broadcast receiving module and the antenna respectively, the second high-pass filter is connected with the second mobile multimedia broadcast receiving module and the antenna respectively.

Figure 3:
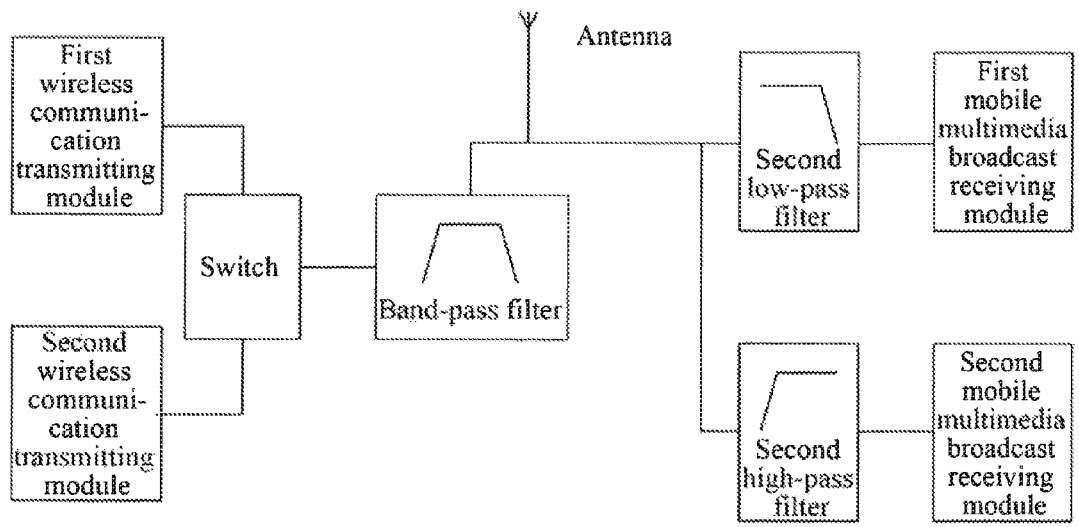

As shown in FIG. 3, the first filter in the present embodiment is a band-pass filter, the first wireless communication transmitting module and the second wireless communication transmitting module are respectively connected with the switch, the switch is also connected with the band-pass filter, the band-pass filter is connected with the antenna. The second filter comprises a second low-pass filter and a second high-pass filter, the second low-pass filter is connected with the first mobile multimedia broadcast receiving module and the antenna respectively, and the second high-pass filter is connected with the second mobile multimedia broadcast receiving module and the antenna respectively.

Figure 4:
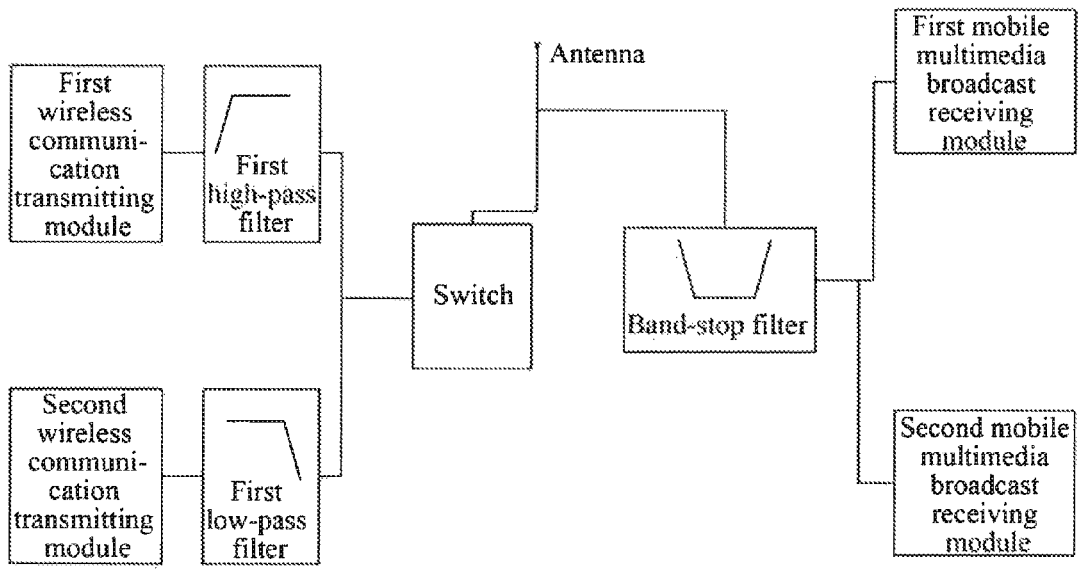

As shown in FIG. 4, the first filter in the present embodiment comprises a first high-pass filter and a first low-pass filter, the first high-pass filter is connected with the first wireless communication transmitting module and the switch, the first low-pass filter is connected with the second wireless communication transmitting module and the switch, and the switch is also connected with the antenna. The second filter is a band-stop filter, the first mobile multimedia broadcast receiving module and the second mobile multimedia broadcast receiving module are respectively connected with the band-stop filter, and the band-stop filter is also connected with the antenna.

In the following, how the present embodiment eliminates the co-channel interference of the GSM900 transmitting frequency band with the CMMB U-band reception, as well as the co-channel interference of the PCS1900 transmitting frequency band with the CMMB S-band reception in the co-antenna scheme will be respectively illustrated.

Figure 5:
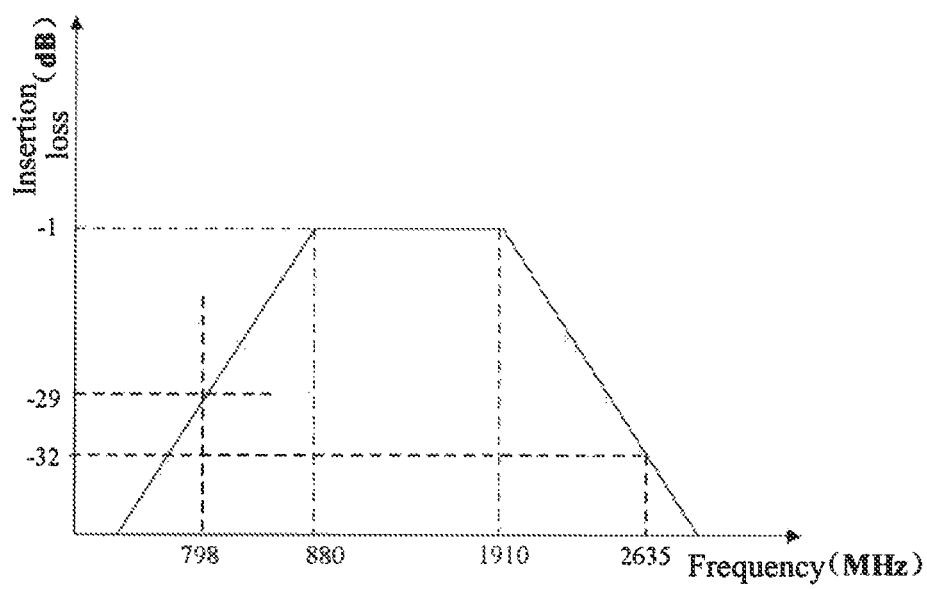
FIG. 5 is a schematic diagram of the "amplitude-frequency" characteristic that should be achieved by the band-pass filter used in an embodiment of the present document.
Figure 6:
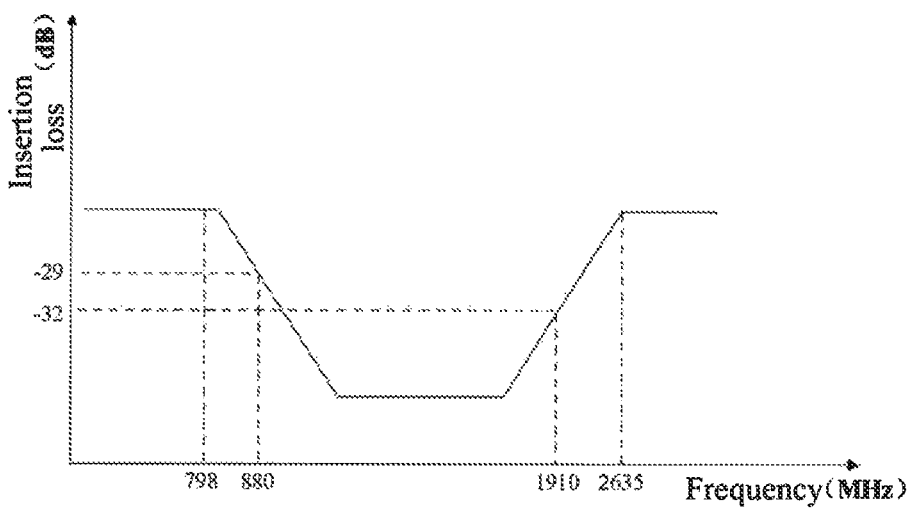
FIG. 6 is a schematic diagram of the "amplitude-frequency" characteristic that should be achieved by the band-stop filter used in an embodiment of the present document.

Referring to FIG. 1, in the normal standby condition, the communication module and the CMMB module are respectively in the radio frequency receiving state, the GSM900 transmitting frequency band does not generate interference with the CMMB in the communication module. During booting, the GSM900 starts to search for the network, and the icon of standby can be seen after the registration is successful, the CMMB module is also in the standby mode after receiving signals. After starting CMMB playing, the CMMB is in the normal receiving state; when the GSM900 has an incoming call, the communication module is in a call state after the user answers the call, and the maximum power of the GSM900 wireless transmitting module is 33 dBm, the sideband noise in the U-band is −36 dBm@3 MHz, and after the 23 dB attenuation of the band-pass filter shown in FIG. 5, the GSM900 sideband noise is reduced to −64 dBm@1 MHz, and because the bandwidth of the CMMB channel is 8 MHz, and after the 35 dB attenuation of the band-stop filter shown in FIG. 6, the co-channel interference signals arrived at the CMMB U-band receiving module is −99 dBm@1 MHz; in addition, from the CMMB protocol, it can be found that the maximum co-channel interference which can be withstood in the U-band in the case of −99 dBm@1 MHz receiving sensitivity is −89.8 dBm, from the above calculation result, it can be seen that the interference brought by the GSM900 sideband is less than the extreme condition which can be withstood by the CMMB, and it will not bring interference with the CMMB receiver in the U band, thereby ensuring the normal demodulation of the CMMB television signals, so as to not affect the user to watch.

In the following, how the present embodiment eliminates the co-channel interference of the PCS1900 frequency band with the CMMB S-band reception in the common antenna scheme will be illustrated, in the normal standby condition, the communication module and the CMMB module are respectively in the radio frequency receiving state, the PCS1900 wireless communication transmitting module in the communication module does not generate interference with the CMMB. During booting, the PCS1900 starts to search for the network, and the icon of the standby can be seen after the registration is successful, the CMMB module is also in the standby mode after receiving signals. After starting CMMB playing, the CMMB is in the normal receiving state; when the PCS1900 has an incoming call, the communication module is in a call state after the user answers the call, the maximum power of the PCS1900 wireless communication transmitting module is 30 dBm, the sideband noise in the S-band is −30 dBm@3 MHz, after the 30 dB attenuation of the band-pass filter shown in FIG. 5, the PCS1900 sideband noise is decreased to −65 dBm@1 MHz, because the bandwidth of the CMMB channel is 8 MHz, and after the 34 dB attenuation of the band-stop filter shown in FIG. 6, the co-channel interference signal arrived at the CMMB S-band receiving module is −99 dBm@1 MHz; the maximum co-channel interference which can be withstood in the S-band in the case of −99 dBm receiving sensitivity is −89.8 dBm, from the above calculation result, it can be seen that the interference brought by the PCS1900 sideband is less than the extreme condition which can be withstood by the CMMB, and it will not cause interference with the CMMB receiver in the S band, thereby ensuring the normal demodulation of the CMMB television signals, so as to not affect the user to watch.

Figure 7:
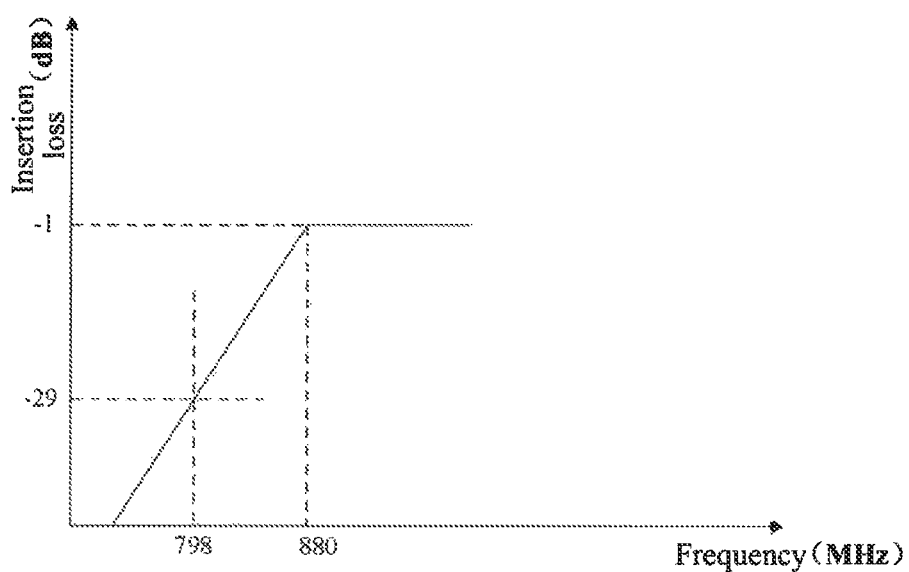
FIG. 7 is a schematic diagram of the "amplitude-frequency" characteristic that should be achieved by a first high-pass filter used in an embodiment of the present document.
Figure 8:
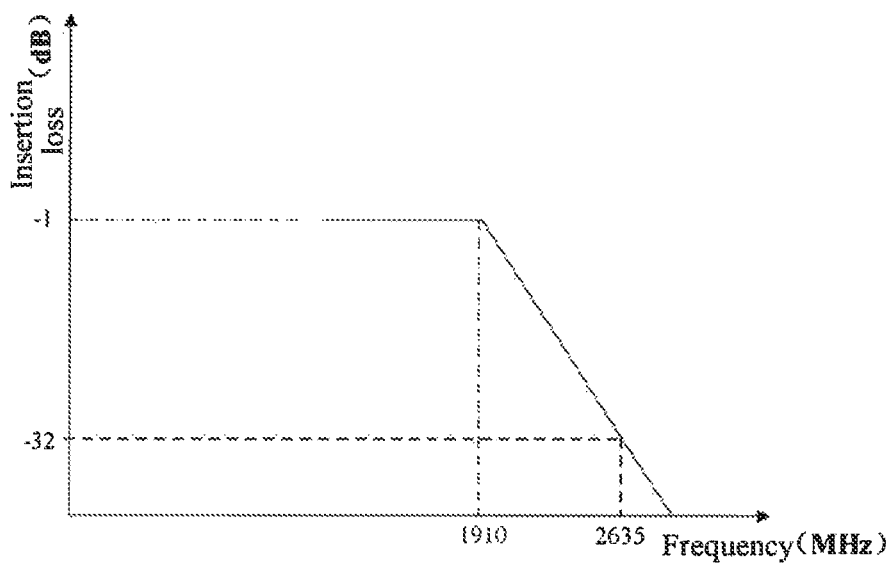
FIG. 8 is a schematic diagram of the "amplitude-frequency" characteristic that should be achieved by a first low-pass filter used in an embodiment of the present document.
Figure 9:
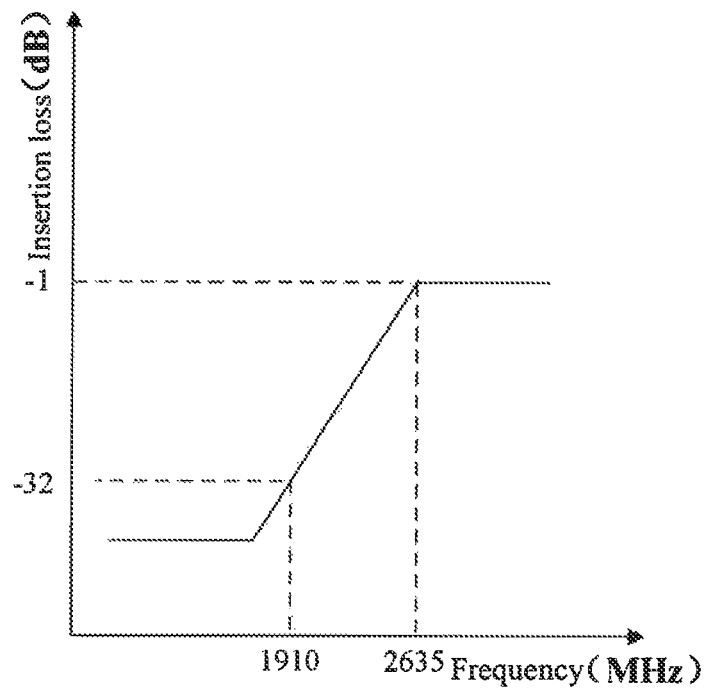
FIG. 9 is a schematic diagram of the "amplitude-frequency" characteristic that should be achieved by a second high-pass filter used in an embodiment of present document.
Figure 10:
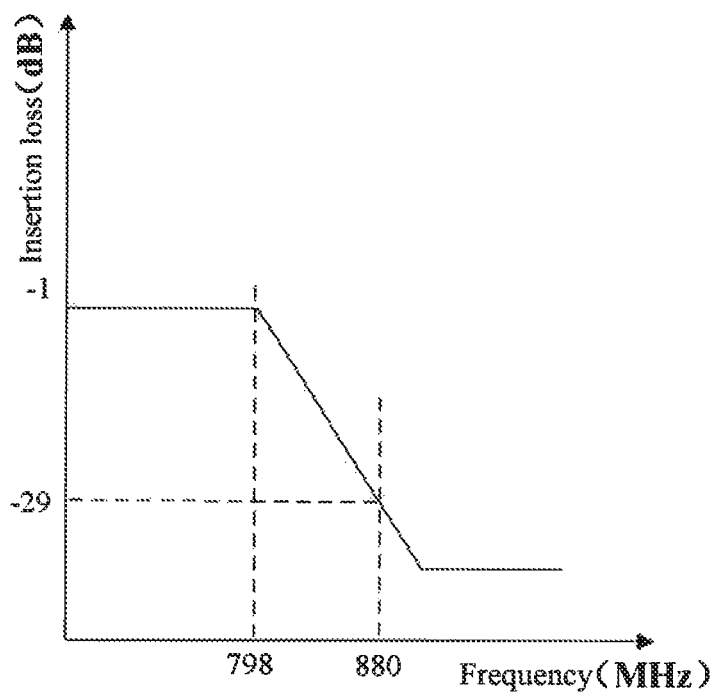
FIG. 10 is a schematic diagram of the "amplitude-frequency" characteristic that should be achieved by a second low-pass filter used in an embodiment of the present document.

In the schemes in FIG. 2 to FIG. 4, the band-pass filters may be replaced with the first high-pass filter and the first low-pass filter, the "amplitude~frequency" characteristics are shown in FIG. 7 and FIG. 8 respectively; the band-stop filters may be replaced with the second high-pass filter and the second low-pass filter, the "amplitude~frequency" characteristics are shown in FIG. 9 and FIG. 10 respectively. For the non-integrated switch and CMMB module, the schemes in FIG. 2 to FIG. 4 are more flexible, the implementations of the filters are also simpler, and capacitors and inductors can be used to implement filtering, and the cost will be lower.

The present embodiment further provides a method for transmitting and receiving radio frequency signals, comprising: when the wireless communication service and the mobile multimedia broadcast service co-occur, the mobile terminal filtering the signals of the to-be-transmitted wireless communication service to suppress the sideband noise generated on the signals of the mobile multimedia broadcast service when transmitting the signals of the wireless communication service, and transmitting the signals of the wireless communication service via the antenna; meanwhile, receiving signals of the mobile multimedia broadcast service via the antenna, and filtering the signals of the mobile multimedia broadcast service to suppress the sideband noise generated on the signals of the mobile multimedia broadcast service when transmitting the signals of the wireless communication service.

The signals of the wireless communications services transmitted by the first wireless communication transmitting module and the second wireless communication transmitting module are filtered by band-pass filters, or, the signals of the wireless communication service transmitted by the first wireless communication transmitting module are filtered by the first high-pass filter, the signals of the wireless communication service transmitted by the second wireless communication transmitting module are filtered by the first low-pass filter.

The signals of the wireless communications services received by the first wireless communication receiving module and the second wireless communication receiving module are filtered by band-stop filters, or, the signals of the wireless communication service received by the first wireless communication receiving module are filtered by the second low-pass filter, and the signals of the wireless communication service received by the second wireless communication receiving module are filtered by the second high-pass filter.

Obviously, a person skilled in the art should understand that respective modules or steps in the abovementioned embodiments of the present document can be implemented with general-purpose computing devices, they can be concentrated on a single computing device or distributed in a network consisting of multiple computing devices, alternatively, they may be executed by program codes executable by computing devices, so that they can be stored in storage means and executed by computing devices, or they can be made into individual integrated circuit modules, or some of the modules or steps can be made into a single integrated circuit module to implement. Therefore, the embodiments of the present document are not limited to any specific combination of hardware and software.

The above description is only for preferred embodiments of the present document and not intended to limit the present document, and for a person skilled in the art, the embodiments of the present document may have various changes and modifications. Any changes, equivalent replacements and improvements made within the spirit and principle of the embodiments of present document should be included within the protection scope of the embodiments of the present document.

INDUSTRIAL APPLICABILITY

By adding filters into the wireless communication link and the CMMB receiving path, the embodiment of the present document suppresses the sideband noise in the transmitting frequency band of the wireless communication transmitting module to achieve the common antenna scheme of the wireless communication transmitting module and the CMMB, thus prevent the radio frequency signals of the wireless communication transmitting module in the terminal from interfering with the CMMB, the GSM900/PCS1900 frequency band of the wireless communication transmitting module and the U/S-band of the CMMB in accordance with the embodiment of the present document can share one antenna, thereby reducing the difficulty of structural design and the hardware cost, meanwhile both radio frequency systems can work simultaneously, while the wireless communication transmitting module does not interfere with reception performance of the CMMB.

What is claimed is:

1. A mobile terminal, comprising: an antenna, a wireless communication transmitting module and a mobile multimedia broadcast receiving module which are connected with the antenna, a first filter which is connected between the wireless communication transmitting module and the antenna, and a second filter which is connected between the mobile multimedia broadcast receiving module and the antenna, wherein:
the first filter and the second filter are configured to suppress sideband noise generated on the mobile multimedia broadcast receiving module when the wireless communication transmitting module transmits signals;
the wireless communication transmitting module comprises a first wireless communication transmitting module and a second wireless communication transmitting module, the first wireless communication transmitting module is a Global System for Mobile, GSM, 900 wireless communication transmitting module, the second wireless communication transmitting module is a Personal Communications Services, PCS, 1900 wireless communication transmitting module;
the mobile multimedia broadcast receiving module comprises a first mobile multimedia broadcast receiving module and a second mobile multimedia broadcast receiving module, the first mobile multimedia broadcast receiving module is a China mobile Multimedia Broadcasting, CMMB, U-band receiving module, the second mobile multimedia broadcast receiving module is a CMMB S-band receiving module;
the first filter is configured to allow signals in GSM900 transmitting frequency bands of the GSM 900 wireless communication transmitting module and PCS1900 transmitting frequency bands of the PCS1900 wireless communication transmitting module pass through successfully, but attenuate sideband noise in U-band of the CMMB U-band receiving module and S-band of the CMMB S-band receiving module;
the second filter is configured to suppress sideband signals in the GSM900 transmitting frequency bands of the GSM 900 wireless communication transmitting module and PCS1900 transmitting frequency bands of the PCS1900 wireless communication transmitting module, but do not attenuate CMMB signals of the CMMB U-band receiving module and the CMMB S-band receiving module at all; and interference brought by the GSM900 sideband does not bring interference with the CMMB in the U band, and interference brought by the PCS1900 sideband does not cause interference with the CMMB in the S band.

2. The mobile terminal of claim 1, further comprising:
a switch; the first wireless communication transmitting module and the second wireless communication transmitting module are connected with the antenna via the switch, wherein:
the switch is configured to control to transmit signals of the first wireless communication transmitting module or the second wireless communication transmitting module to the antenna.

3. The mobile terminal of claim 2, wherein, the first filter is a band-pass filter, and the switch is connected with the antenna via the band-pass filter.

4. The mobile terminal of claim 3, wherein, the second filter is a band-stop filter, and the first mobile multimedia broadcast receiving module and the second mobile multimedia broadcast receiving module are respectively connected with the antenna through the band-stop filter.

5. The mobile terminal of claim 3, wherein, the second filter comprises a second low-pass filter and a second high-pass filter, the first mobile multimedia broadcast receiving module is connected with the antenna through the second low-pass filter, the second mobile multimedia broadcast receiving module is connected with the antenna through the second high-pass filter.

6. The mobile terminal of claim 2, wherein, the first filter comprises a first high-pass filter and a first low-pass filter, the first wireless communication transmitting module is connected with the switch through the first high-pass filter, and the second wireless communication transmitting module is connected with the switch through the first low-pass filter.

7. The mobile terminal of claim 6, wherein, the second filter is a band-stop filter, and the first mobile multimedia broadcast receiving module and the second mobile multimedia broadcast receiving module are respectively connected with the antenna through the band-stop filter.

8. The mobile terminal of claim 6, wherein, the the second filter comprises a second low-pass filter and a second high-pass filter, the first mobile multimedia broadcast receiving module is connected with the antenna through the second low-pass filter, the second mobile multimedia broadcast receiving module is connected with the antenna through the second high-pass filter.

9. A method for transmitting and receiving radio frequency signals, comprising:
when a wireless communications service and a mobile multimedia broadcast service co-occur,
a mobile terminal filtering signals of the wireless communications service to suppress sideband noise generated on signals of the mobile multimedia broadcast service when transmitting the signals of the wireless communication service, and transmitting signals of the wireless communication service via an antenna of the mobile terminal;
the mobile terminal receiving signals of the mobile multimedia broadcast service via the antenna, and filtering the signals of the mobile multimedia broadcast service to suppress the sideband noise generated on the signals of the mobile multimedia broadcast service when transmitting the signals of the wireless communication service;
the mobile terminal comprises a first wireless communication transmitting module and a second wireless communication transmitting module, signals of the wireless communications service comprises signals of the wireless communication services transmitted by the first wireless communication transmitting module and the second wireless communication transmitting module, the first wireless communication transmitting module is a Global System for Mobile, GSM, 900 wireless communication transmitting module, the second wireless communication transmitting module is a Personal Communications Services, PCS, 1900 wireless communication transmitting module;
the mobile terminal comprises a first mobile multimedia broadcast receiving module and a second mobile multimedia broadcast receiving module, the signals of the mobile multimedia broadcast service comprise signals of mobile multimedia broadcast services received by the first mobile multimedia broadcast receiving module and the second mobile multimedia broadcast receiving module, the first mobile multimedia broadcast receiving module is a China mobile Multimedia Broadcasting, CMMB, U-band receiving module, the second mobile multimedia broadcast receiving module is a CMMB S-band receiving module;
the mobile terminal allows signals in GSM900 transmitting frequency bands of the GSM 900 wireless communication transmitting module and PCS1900 transmitting frequency bands of the PCS1900 wireless communication transmitting module pass through successfully, but attenuates sideband noise in U-band of the CMMB U-band receiving module and S-band of the CMMB S-band receiving module;
the mobile terminal suppresses sideband signals in the GSM900 transmitting frequency bands of the GSM 900 wireless communication transmitting module and PCS1900 transmitting frequency bands of the PCS1900 wireless communication transmitting module, but does not attenuate CMMB signals of the CMMB U-band receiving module and the CMMB S-band receiving module at all;
interference brought by the GSM900 sideband does not bring interference with the CMMB in the U band, and interference brought by the PCS1900 sideband does not cause interference with the CMMB in the S band.

10. The method of claim 9, wherein:
wherein band-pass filters are used for filtering signals of the wireless communication services transmitted by the first wireless communication transmitting module and the second wireless communication transmitting module, or, a first high-pass filter is used for filtering the signals of the wireless communication service transmitted by the first wireless communication transmitting module, and a first low-pass filter is used for filtering the signals of the wireless communication service transmitted by the second wireless communication transmitting module.

11. The method of claim 9, wherein:
wherein band-stop filters are used to filter signals of mobile multimedia broadcast services received by the first mobile multimedia broadcast receiving module and the second mobile multimedia broadcast receiving module, or, a second low-pass filter is used to filter the signals of the mobile multimedia broadcast service received by the first mobile multimedia broadcast receiving module, and a second high-pass filter is used to filter the signals of the mobile multimedia broadcast service received by the second mobile multimedia broadcast receiving module.

\* \* \* \* \*